Figure 1:
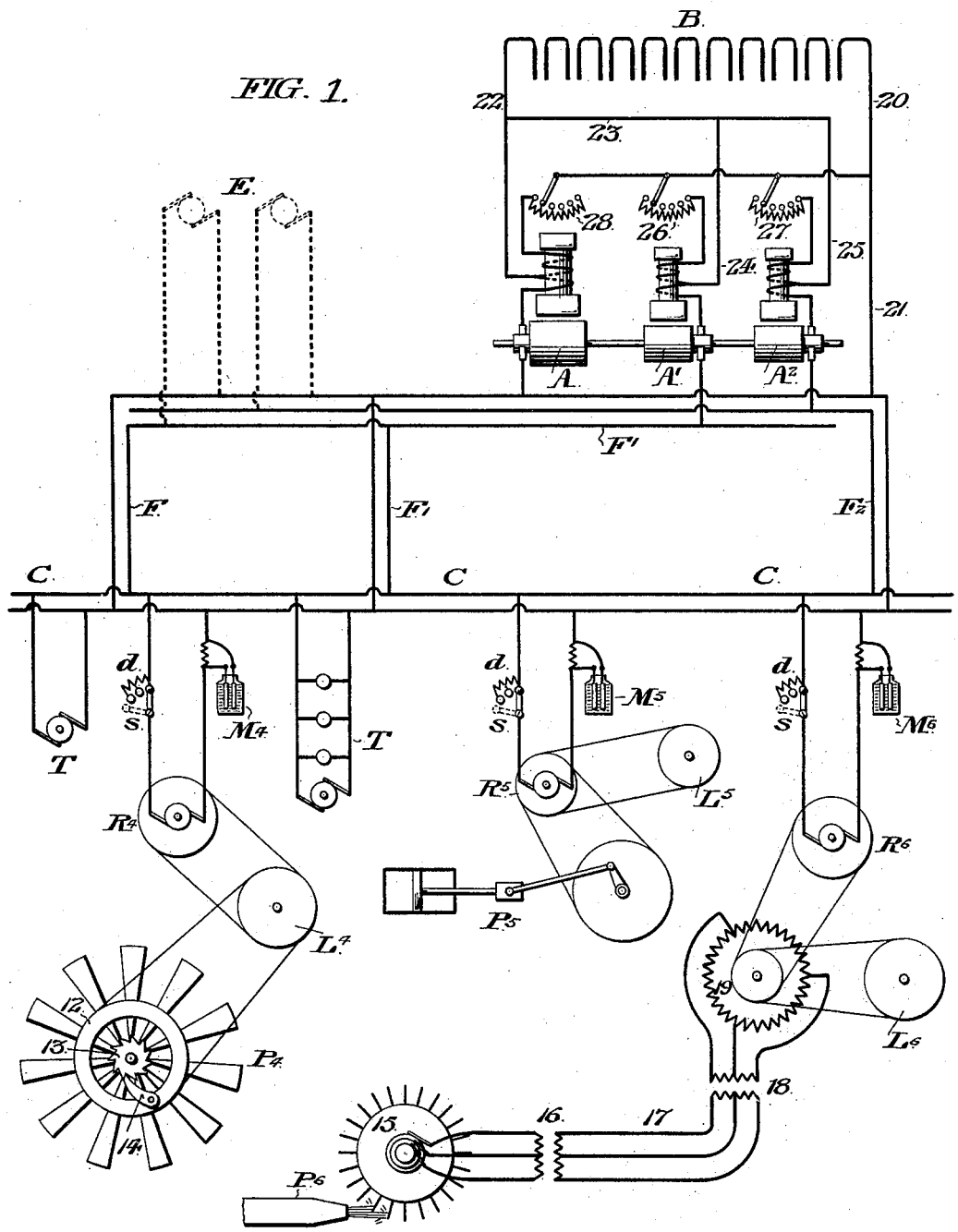

(No Model.) 2 Sheets—Sheet 1.

H. B. GALE.
DISTRIBUTION AND REGULATION OF POWER.

No. 565,138. Patented Aug. 4, 1896.

WITNESSES:

INVENTOR:
H. B. Gale (No Model.) 2 Sheets—Sheet 2.

H. B. GALE.
DISTRIBUTION AND REGULATION OF POWER.

No. 565,138. Patented Aug. 4, 1896.

WITNESSES:
A. E. Paige
James H. Bell

INVENTOR:
H. B. Gale,
By J. B. C. Kelly
Attorney

UNITED STATES PATENT OFFICE.

HORACE B. GALE, OF SAN FRANCISCO, CALIFORNIA.

DISTRIBUTION AND REGULATION OF POWER.

SPECIFICATION forming part of Letters Patent No. 565,138, dated August 4, 1896.

Application filed June 17, 1895. Serial No. 553,159. (No model.)

*To all whom it may concern:*

Be it known that I, HORACE B. GALE, a citizen of the United States, residing in San Francisco, in the county of San Francisco and State of California, have invented a new and useful System of Regulation and Distribution of Power, of which the following is a specification, reference being had to the accompanying drawings, which form a part thereof.

The main objects of my invention are to promote economy in the operation of prime motors which are employed in doing a variable or intermittent work by enabling them to run continuously under a steady and advantageous load; to secure improved regulation of speed in prime motors under such conditions; to provide means whereby a working load considerably beyond the normal power of a prime motor may be carried whenever desired, and to insure against the enforced stoppage of the driven machinery on account of any accident requiring the stoppage of the prime motor.

The method by which I accomplish these objects consists in coupling with each prime motor to be regulated a dynamo-electric machine connected to a set of electrical conductors extending through the district served by the system in a way similar to that in which the conductors are run for the distribution of electricity for light under any of the so-called "constant-potential" systems, said conductors comprehending in their circuit means whereby an excess of electrical energy beyond the normal may be economically absorbed from and a deficiency of such energy below the normal economically restored to the connected dynamos, which, by opposing or assisting their coupled prime motors, respectively, as may be required, serve to maintain the normal speed and rate of work of each prime motor, irrespective of fluctuations in the resistance opposed thereto by the driven machinery. When the power-regulating conductors are employed solely for the purpose just described, I use a storage battery as the means for absorbing and restoring the electrical energy under departures from the normal, a suitable regulator being preferably interposed between the battery and distributing-circuit to maintain a constant voltage on the latter; but when the same set of conductors is employed also to supply current to lamps and other constant-potential translating devices under a general central-station system of distribution the storage battery is not always necessary. In such a case any excess of electrical energy delivered by the power-wires will be absorbed by the translating devices in the circuit and any deficiency supplied by the central station, the function of the circuit with relation to the power and speed regulating group of devices being practically that of a reservoir of electricity.

The dynamo-electric machine, which serves as the power and speed regulator for a prime motor and its driven machinery, is so constructed and connected that while run continuously at its normal rate of speed its electrical work is automatically adjusted, so as to compensate for fluctuations in the power consumed by the other machinery connected to the motor, absorbing any surplus power exerted by the latter, which otherwise would accelerate the speed of the machinery, in delivering electrical energy to the conducting system. In case the load imposed by the driven machinery at any time exceeds the power supplied by the prime motor the regulating-dynamo automatically reverses its functions and acts as an auxiliary motor, deriving energy from the conducting system and assisting the coupled prime motor to carry the extra load.

By adopting regulating-dynamos of appropriate design this system of regulation may be applied to any class of circuits used for the distribution of electrical energy at constant voltage—such as two-wire or three-wire direct-current circuits and alternating-current circuits, either single phase or polyphase.

The terms "contant voltage" and "constant potential" are used in this specification in their ordinary or commercial acceptation as applied to electrical distributing-circuits conveying either direct or alternating currents in which the mean difference of potential between a pair of conductors is as nearly constant as is necessary for the successful operation of constant-potential lamps.

Figure 2:
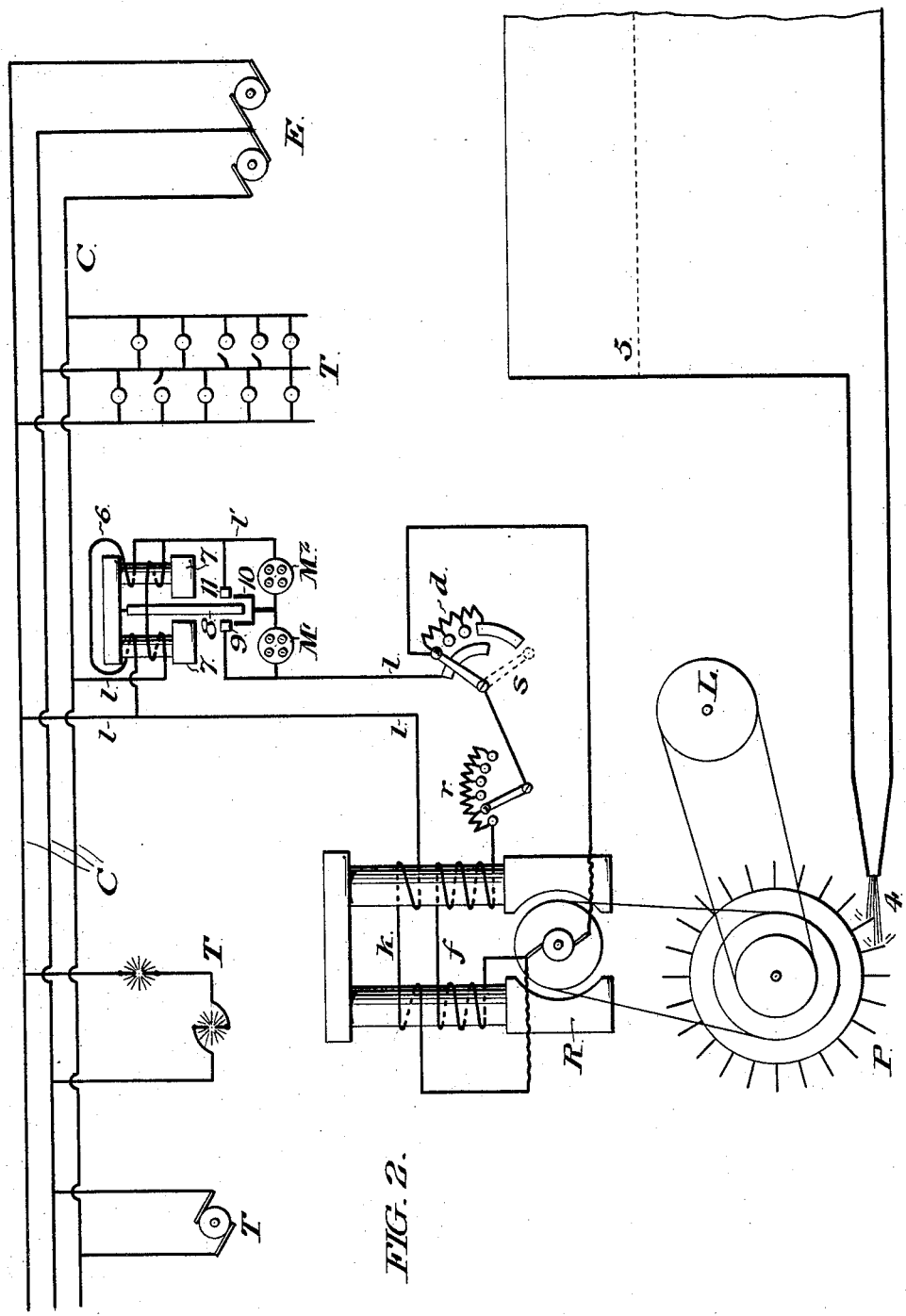

Figures 1 and 2 illustrate diagrammatically typical embodiments of my invention, together with certain adjuncts highly useful in connection with the general system, and susceptible also of use in connection with the power-distributing systems which do not necessarily embody the features of a reservoir; but when the communication between the respective dynamos of individual prime movers is direct, or, in other words, when said dynamos are merely coupled together, so as to merely distribute fluctuations, as distinguished from maintaining the rate of work of each without variation of the working of other individuals of the group.

Referring now to Fig. 1, C indicates a set of constant-potential distributing-conductors, representing in this case a two-wire direct-current system of distribution.

T indicates translating devices in circuit.

$R^4$, $R^5$, and $R^6$ indicate speed-regulating dynamos, coupled by power-transmitting connections with prime motors $P^4$, $P^5$, and $P^6$, driving the independent loads $L^4$, $L^5$, and $L^6$, respectively.

Different types of prime motors are taken for illustration—$P^4$ indicating a windmill, $P^5$ a piston-engine, and $P^6$ a tangential water-wheel—and various methods of coupling the prime motors with the regulating-armatures and the independent load-shafts are also illustrated. Thus, in the case of the windmill $P^4$, the driving-pulley 12 is connected to the windmill-shaft by a ratchet 13 and a pawl 14, so that in case the force of the wind is not sufficient to drive the windmill the latter is allowed to stop, while the regulating-dynamo, acting as a motor, keeps the loaded shaft $L^4$ in rotation at its proper speed. Whenever the force of the wind increases so as to bring the wheel 13 again to its proper speed, it continues to drive the load $L^4$ by means of the pawl 14, as before, and when its power increases beyond the requirements of the load $L^4$ the excess is absorbed by the regulating-dynamo $R^4$ in delivering current to the distributing-circuit C, the speed remaining practically constant.

The water-wheel $P^6$ is supposed to be located at a considerable distance from the driven shaft $L^6$, which may represent, for example, the main shaft of a mill or factory, and an electrical power-transmitting connection is used between them, consisting of a three-phase generator 15, step-up transformer 16, line 17, step-down transformer 18, and three-phase induction-motor 19, the latter being belted to the working shaft $L^6$ and to the regulating-armature $R^6$. The water-wheel in this case may be run with a constant gate-opening, and a practically uniform power may be transmitted over the line 17 to the motor 19, any fluctuations in the load $L^6$ being compensated for by the action of the regulator $R^6$.

The action of the regulating-dynamos may be better understood by reference to Fig. 2, in which C indicates a set of conductors, energized from the electric generating-station E, distributing electricity at constant potential to the translating devices T.

P indicates a prime motor represented in the diagram as a tangential water-wheel driven by the jet 4 from the reservoir 5 and connected by a band or pulleys with the shaft L, which offers a working resistance at times greater and at times less than the normal effort of the prime motor P.

R indicates the dynamo-electric machine whose office is to regulate the speed of the prime motor P and its driven machinery L. It is represented as a direct-current dynamo, having a shunt-field winding $f$, by which the field is energized to such a degree that when the dynamo is running at its normal speed, with no current flowing in the armature except what is required for field-excitation, the electromotive force induced therein exactly balances that on the circuit C. Under these circumstances the regulating-dynamo neither receives power from the circuit C nor delivers any thereto, and as long as the total resistance opposed to the prime motor by the load L and the regulator R remains equal to the power exerted by the prime motor at its normal speed there is no tendency to speed variation; but if a part of the load on the shaft L is thrown off the slight momentary increase of speed which follows raises the electromotive force of the regulating-armature slightly above that of the circuit C, and the machine begins to act as a generator. As soon as the resistance thus opposed to the prime motor is sufficient to compensate for the load removed from the shaft L the equilibrium of effort and resistance is restored, the speed having been brought back meanwhile to the normal rate by the influence of the compound winding, which sustains the increased electromotive force required for the generator-action. When the regulating-dynamo is well proportioned to adapt it to this service and the voltage in the conductors is efficiently maintained by independent means, the momentary change in speed accompanying a change of load is so slight as to be practically inappreciable, and the normal rate is regained instantaneously, the power or rate of work of the prime motor remaining also unchanged. If, on the other hand, the load on the shaft L is increased, the momentary diminution of speed produced by the added load starts a current in the opposite direction through the regulating-armature, which now acts as a motor, assisting the prime motor P to carry the increased load. The dynamo R thus automatically regulates the speed and rate of work of the prime motor P by continually adjusting the net resistance to equilibrium with the effort exerted by the prime motor at its normal rate of speed. The system will permit a load to be thrown on the shaft L at times that would be entirely beyond the capacity of the prime motor if unaided by the motor action of the regulating-dynamo, and will permit also sudden and violent fluctuations of load, which, though within the capacity of the prime motor, would otherwise be destructive of economy in its operation, as, for example, in a steam-engine, or which, as in the case of the water-wheel, would make efficient speed-regulation difficult or impossible. It is evident that the regulating-dynamo may also be employed alone as a motor to drive the shaft L in case the prime motor is disabled or temporarily out of service.

In order that equilibrium may be attained at the same speed, under all conditions of load, without requiring any alteration of the rate of work or of the supply of working fluid in the prime motor P, or any adjustment of the dynamo R by a field-rheostat or equivalent means, the series field-coil $k$ is so wound and proportioned that, when the machine acts as a generator, the current flowing in the armature strengthens the field, and when it acts as a motor the reversed current weakens the field, in each case by an amount sufficient to balance, approximately, the electromotive force required to overcome the resistance of the armature and brushes, the series field-coil and the branch wires $l$, connecting the machine-terminals with the circuit C. A rheostat $r$ in the shunt field-circuit may be utilized as an auxiliary to the coil $k$ to compensate for slight changes of voltage in the mains, and, if desired, to vary the speed of the regulator within certain limits.

I have found that a dynamo-electric machine may be constructed upon this principle which, when connected to a constant-potential circuit, will maintain practically a constant speed under all conditions of load within its capacity whether running as a generator or as a motor.

R indicates diagrammatically a simple or elementary type of compensating-dynamo which may be so employed; but it must be understood that I do not limit my claims herein to the use of any special type or construction of regulating-dynamo, as the purpose of the present invention may be served in some cases by other types.

The diagram represents the regulator as connected between the positive and negative wires of a three-wire circuit; but the same arrangement is applicable in a two-wire system. A switch $s$ is generally provided for disconnecting the regulator from the circuit, and is preferably furnished with a resistance-coil $d$, as shown, to reduce the sparking and shock to the machinery when the regulator is thrown off and on.

It is evident that this method of regulation will compensate for changes in the power exerted by the prime motor—such as might result in Fig. 2 from fluctuations in the head of water in the reservoir 5—as well as for changes in the load L.

When a plurality of power-regulators are supplied commercially from a central station, or when commercially independent plants are to be regulated by interconnection, even without the intervention of a reservoir, some method of determining the net quantity or balance of energy absorbed or delivered by each regulator is required. This requirement is fulfilled by the use of a suitable metering device interposed in the branch circuit leading to each regulator.

In Fig. 2, $M'$ and $M^2$ indicate recording-meters of any suitable type, connected in series in a loop $l'$ from the supply-circuit $l$. The loop is carried also, as shown, around the cores of the magnet 7, which has a second coil of high resistance, 6, in circuit between the positive and negative sides of the supply-circuit through a portion of the loop $l'$. The armature of the magnet 8 is adapted to close a short circuit between the contacts 9 and 10, or 10 and 11, according as it is attracted by one or the other pole of the magnet. The winding of the magnet being such that one or the other pole will predominate according to the direction of the flow of the current in the loop $l'$, one meter will be cut out or short-circuited when the regulating-dynamo R is supplying energy to the circuit C, and the other will be cut out when energy is being withdrawn from the circuit. The balance between the energy delivered and the energy absorbed by the branch circuit $l$ during any interval can be ascertained from the difference between the indications of the meters $M'$ and $M^2$. Instead of the pair of meters shown in Fig. 2, a single meter may be employed, whose integrating process is reversed when the direction of the flow of energy changes.

It is evident that if the supply of working fluid to each of the prime motors connected to the system is to be regulated independently while the total load of the system varies, an excess of electrical energy will be delivered at times to the circuit C, while at other times there may be a deficiency. This if not in some way provided for would cause a fluctuation of voltage on the circuit C and a corresponding fluctuation in the speed and rate of work of all the connected prime motors. To prevent such fluctuation, and to provide for maintaining the normal rate of work of each prime motor independently of the others and unaffected by variations in its own load, or in the total load of the system, I add a storage battery, connected to the system in such a manner that it receives and stores any surplus of electrical energy at any time supplied to the conductors C and gives back the same when required, the fluctuations in potential difference at the terminals of the battery, under different conditions of charge, being provided for by a suitable regulator interposed between it and the distributing-circuit.

Various methods of compensating for such fluctuations of potential are known in the art which are adapted to this purpose. A good method for use on direct-current circuits is illustrated in Fig. 3, but this device is not applicable in all cases.

In Fig. 3, F, F', and F² indicate "feeders" connected to the distributing-circuit C at different points. B indicates a storage battery, one pole of which, 20, is connected to one side of this circuit through the wire 21. The other pole, 22, is connected to the other side of the feeders F' and F², respectively, through the wires 23, 24, and 25, and the armatures A' and A². The latter are mounted on the same shaft with the armature A and generate electromotive forces opposed to that of the battery, *i. e.*, their electromotive forces oppose a flow of current from the positive pole of the battery to the feeders F, F', and F², and assist the flow when it takes place in the contrary direction. The fields of these armatures are regulable by the rheostats 26 and 27, by means of which the voltage on the separate feeders may be adjusted. The speed of revolution is determined by the armature A, which is in circuit between the terminals of the battery and acts as a motor or a generator, according to the direction of flow of the current in the armatures A' and A². The field of A is also regulable by the rheostat 28, and the fields of A, A', and A² are preferably compound wound, so as to balance the fall of potential due to the resistance of their respective armatures and connections.

Without the storage battery every variation in the total load on the system must be accompanied by an equal variation in the total power applied to the prime motors, the only purpose served by the regulating armatures and conductors being to transfer such fluctuations from one prime motor or set of prime motors to another. The ultimate regulation has to be obtained in such a case by the usual method of varying the quantity or pressure of the working fluid supplied to one or more of the prime motors, so as to make the total power applied fluctuate in correspondence with the fluctuations in the total load; but the combination illustrated in Fig. 1 is capable of regulating not only the speed but also the power, or rate of work, of all the connected prime motors, so that the operation of each may be adjusted and maintained at its most advantageous rate without regard to fluctuations in the individual and total loads.

The average rate of work may be increased by connecting more translating devices T, and if it surpasses the most economical rate of the prime motors it may be diminished, if desired, by employing an independent electrical generating-plant E, (shown in dotted lines in Fig. 1,) to supply the balance of power. In many cases, however, the battery B, with its regulating devices, is sufficient without the supplemental generating-plant E.

M⁴, M⁵, and M⁶ indicate metering devices in the separate branch circuits leading to the power-regulators. Simple electrolytic meters are here indicated, each placed, as usual, in a shunt from the supply-circuit. The deposit is made upon one electrode when the flow of the current is from the positive side of the main line to the regulator, and upon the other electrode when the flow is from the contrary direction.

At the periodic inspections the customer is charged with any increase in the weight of the former electrode, or credited with any increase in the weight of the latter.

The general principle of regulating the speed and power of a prime mover by adjusting the resistance to be overcome thereby so as to balance the driving effort by means of a compensating electric generator or motor is not herein claimed as new, as the use of such a machine, having its armature-terminals directly connected to the poles of a storage battery, is set forth in my United States Patent No. 518,062, dated April 10, 1894.

The method of connecting a storage battery directly to the armature-terminals of the speed-regulating dynamo is, however, attended with the consequence that the regulating-dynamo is thus subjected to the variable voltage of the battery, which depends not alone upon the magnitude and direction of the current flowing therein at any time, but also upon the state of its charge, which varies with the time during which it has been receiving or delivering a current. This variation of voltage, therefore, cannot be compensated for, perfectly, by a compound winding on the regulating-dynamo.

In the combination shown in Fig. 1 each regulating-dynamo, instead of being directly connected with the battery-terminals, is connected therewith through a system of distributing-conductors independently maintained at a constant voltage—such a system as is already installed in many cities and towns. The employment of a constant voltage on the regulating-dynamos, as obtained by the interposition between them and the battery of a regulator, as shown in Fig. 1, makes it possible to obtain practically perfect speed-regulation by means of a compound winding; and the employment in the combination also of reversible metering devices renders commercially practicable the regulation of a large number of independently-controlled prime motors from a single central station, thereby obviating the disadvantages of a number of scattered small battery-plants. This system, moreover, permits advantage to be taken of the fact that the fluctuations in the separate loads and powers of a large number of individual prime motors engaged in various works and deriving power from separate sources will tend in some degree to balance each other, so that the capacity of the central battery may be made less than the total of the equivalent separate plants—the central station, on this system, being required to perform simply the office of a "clearing-house" for the power generated and consumed in its district.

Having now described my invention, I claim—

1. In a system of electrical distribution, the combination of a set of main electrical conductors; separately-loaded motors energized from other sources in various parts of the district served by the system; dynamo-electric machines coupled by power-transmitting connections with the motors, respectively, said dynamo-electric machines being capable of acting either as generators, delivering electrical energy to the main conductors, or as auxiliary motors, absorbing energy from the main conductors and assisting their coupled primary motors in the manner described; branch conductors between the main conductors and said dynamo-electric machine; and reversible metering devices, whereby the balance between the energy delivered and the energy absorbed by the said branch circuits separately may be ascertained, substantially as described.

2. The combination of a plurality of separately-loaded prime motors; automatic regulating-dynamos operatively connected therewith respectively, and adapted to serve either as generators or as auxiliary motors, according as the separate loads applied to the corresponding prime motors respectively exceed or fall short of the power exerted thereby at the normal speed, as described; a set of electrical conductors connected to the said regulating-dynamos; a storage battery adapted to receive and store the surplus of energy at times delivered to the said conductors and to give back the same when required; and a regulator adapted to control the charging and discharging rate of the battery so as to preserve a constant voltage in the conductors, whereby the normal speed and rate of work of each of the connected prime motors may be maintained independently of fluctuations in its individual load, and in the total load on the system, substantially as set forth.

3. In a system of regulation and distribution of power, the combination of a set of electrical conductors extending through a district; a plurality of independently-energized and separately-loaded motors in various parts of the district; dynamo-electric machines coupled with said motors, respectively: the said dynamo-electric machines being so constructed and connected to the conducting system as to be capable of acting respectively either as generators or as auxiliary motors, according as the load thrown upon the primary motor and its coupled dynamo at any instant is less or greater than the power exerted by the said primary motor; a storage battery connected to the system, and adapted to receive and store the surplus of energy at times supplied to the conductors and to give back the same when required; and metering devices in the different branch circuits whereby the balance between the energy absorbed and the energy restored by the said branch circuits respectively may be ascertained, substantially as set forth.

4. In a system of electrical distribution, the combination of a set of main electrical conductors extending through a district; prime motors in various parts of the district; independent loads for the said prime motors; dynamo-electric machines operatively connected with the said prime motors respectively, and, by branch circuits, with the said main conductors, and adapted to act either as generators, delivering electrical energy to the conductors, or as auxiliary motors, absorbing energy therefrom, so as to regulate the operation of the prime motors in the manner described; a storage battery, adapted to receive and store the surplus energy at times delivered to the conductors and to give back the same when required; a regulator applied to the storage battery and adapted to control the voltage in the main conductors; and metering devices whereby the balance between the energy delivered and the energy absorbed by the said branch circuits separately may be ascertained, substantially as set forth.

5. In a system of electrical distribution, the combination of a set of conductors extending through the district served by the system; independently-actuated and separately-loaded motors in various parts of the district; dynamo-electric machines coupled therewith respectively, said dynamo-electric machines being so constructed and connected to the conducting system as to be capable of acting interchangeably either as generators, driven by their coupled independent motors and delivering electrical energy to the conductors, or as auxiliary motors, absorbing energy from the conductors and assisting their coupled motors, when required, to drive the external load upon the latter; a main power-supply station, which delivers to the conducting system a quantity of energy sufficient to supply the balance between the total energy absorbed and that delivered by the various branch circuits, so as to maintain the desired difference of potential between the main conductors; and reversible metering devices whereby the balance between the energy delivered and the energy absorbed by the said branch circuits separately may be ascertained, substantially as and for the purposes set forth.

6. In a system of electrical regulation and distribution of energy in a district; the combination of a set of electrical conductors extending through the district, prime motors in various parts of the district, separate loads for said prime motors; dynamo-electric machines coupled with said prime motors respectively, the said dynamo-electric machines being so constructed and connected to the conductors as to be capable of acting interchangeably either as generators delivering electrical energy to the conductors, or as motors absorbing energy from the conductors, when required, to assist their coupled prime motors, as described; a storage battery connected to the system and adapted to receive and store the surplus energy at times delivered to the conductors and to give back the same when required; a power-supply station which delivers to the system a quantity of electrical energy sufficient to supply the balance between the energy absorbed and that delivered to the system on the various branch circuits; and reversible metering devices whereby the balance between the energy delivered and the energy absorbed by the said branch circuits separately may be ascertained, substantially as set forth.

7. In a system of electrical distribution and regulation of power, the combination of a set of constant-potential distributing-conductors extending through a district; separately-loaded prime motors in various parts thereof; direct-current-regulating dynamos operatively connected with the prime motors respectively, and, by branch circuits with the said conductors, the said dynamos having shunt and series field-coils arranged and proportioned to adapt them for service interchangeably as generators and as auxiliary motors, as required to compensate automatically for fluctuations in the separate applied loads in the manner described; a power-supply station adapted to deliver to the conducting system a quantity of energy sufficient to supply the balance between the total energy consumed and that returned to the system by the several branch circuits; and metering devices whereby the balance between the energy absorbed and that delivered by the said branch circuits separately may be ascertained, substantially as set forth.

8. The combination of a prime motor; a direct-current dynamo-electric machine having shunt and series field-windings; power-transmitting connections between the said prime motor and the said dynamo-electric machine; a system of independently-energized distributing-conductors maintaining translating devices in multiple arc connected with the said dynamo-electric machine; which said dynamo-electric machine running continuously at the desired speed is capable of acting alternately as a generator driven by the coupled prime motor delivering current to the conducting system, and as a motor, driven by a reverse current from the conductors and assisting the prime motor, according to whether the load imposed is less or greater than the normal power exerted by the prime motor, thereby regulating automatically the operation of the latter; and a reversible metering device in circuit with the said dynamo-electric machine; whereby the balance between the energy or current received, and that delivered by the said machine may be ascertained, substantially as set forth, and for the purposes specified.

9. The combination of a prime mover; its working load; a dynamo-electric machine operatively connected therewith; a system of independently-energized electrical conductors in circuit with the said dynamo-electric machine, whereby it is permitted to act interchangeably either as a generator driven by the prime mover and delivering electrical energy to the conducting system, or as an auxiliary motor deriving electrical energy from the system, substantially as described; and a metering device adapted to indicate separately the total energy delivered to the conducting system, and the total energy received therefrom, by the said dynamo-electric machine.

10. The combination of a prime mover; its working load; a dynamo-electric machine operatively connected therewith; a system of independently-energized electrical conductors in circuit with the said dynamo-electric machine, whereby it is permitted to act interchangeably either as a generator driven by the prime mover, and delivering electrical energy to the system, or as an auxiliary motor deriving electrical energy from the system, substantially as described; an integrating-meter adapted to record the quantity of energy transferred to and from the said dynamo-electric machine; and means of shifting the connections of the integrating apparatus when the direction of the transfer of energy changes, for the purposes described.

HORACE B. GALE.

Witnesses:
W. A. CARPENTER,
FRANCIS W. HOADLEY.